(12) United States Patent
Vogel et al.

(10) Patent No.: US 7,434,761 B2
(45) Date of Patent: Oct. 14, 2008

(54) CABLE DEPLOYMENT AND STORAGE SYSTEM AND ASSOCIATED METHODS

(75) Inventors: Mark O. Vogel, Statesville, NC (US); Christopher P. Gemme, Hickory, NC (US); Mark E. Alrutz, Hickory, NC (US); Martin B. Lee, Cary, NC (US)

(73) Assignee: Commscope Properties, LLC, Sparks, NV (US)

( * ) Notice: Subject to any disclaimer, the term of this patent is extended or adjusted under 35 U.S.C. 154(b) by 976 days.

(21) Appl. No.: 10/440,995

(22) Filed: May 19, 2003

(65) Prior Publication Data
US 2004/0232275 A1 Nov. 25, 2004

(51) Int. Cl.
*B65H 16/06* (2006.01)

(52) U.S. Cl. .................. 242/614; 242/608.2; 242/608.5

(58) Field of Classification Search ................. 242/614, 242/608.2, 608.5, 608.3, 608.4, 608.6, 608.7, 242/608.8, 118.4, 118.6
See application file for complete search history.

(56) References Cited

U.S. PATENT DOCUMENTS

| | | | |
|---|---|---|---|
| 929,790 A * | 8/1909 | Ruesing, Jr. | ............. 242/597.5 |
| 1,509,717 A | 9/1924 | Davis | |
| 2,000,372 A | 5/1935 | Beck | |
| 3,033,489 A * | 5/1962 | Morris | ................... 242/118.32 |
| 3,589,640 A | 6/1971 | Mapes | ........................ 242/71.8 |
| 4,295,921 A * | 10/1981 | Bopst, III | ................... 156/577 |
| 4,451,013 A | 5/1984 | Bedrosian | ................ 242/118.4 |
| 4,756,488 A * | 7/1988 | Cooke | ..................... 242/608.5 |
| 5,060,882 A | 10/1991 | Rousculp et al. | .............. 242/99 |
| 5,400,567 A | 3/1995 | Lindstrand | ..................... 53/99 |
| 5,692,701 A | 12/1997 | Holliday | ................... 242/598.5 |
| 5,806,787 A | 9/1998 | Schneider | ................ 242/598.5 |

FOREIGN PATENT DOCUMENTS

| | | |
|---|---|---|
| EP | 0 404 043 | 12/1990 |
| WO | 02/31842 | 4/2002 |

* cited by examiner

*Primary Examiner*—Evan H Langdon
(74) *Attorney, Agent, or Firm*—Allen, Dyer, Doppelt, Milbrath & Gilchrist

(57) ABSTRACT

A cable deployment and storage system includes a cable reel mounting device, and a cable reel for carrying a length of cable. The cable reel includes a hub that may be rotatably mounted on the cable reel mounting device during deployment of the length of cable, a pair of inner end flanges carried by respective opposing ends of the hub, and a pair of removable outer end flanges carried by respective inner end flanges to contain the length of cable therebetween during deployment. The outer end flanges may thereafter be removed to reduce a size of the cable reel. The pair of inner end flanges may store any remaining length of cable therebetween after deployment. The cable may include connectors installed at each end during manufacturing.

19 Claims, 6 Drawing Sheets

CABLE DEPLOYMENT AND STORAGE SYSTEM AND ASSOCIATED METHODS

FIELD OF THE INVENTION

The present invention relates to the field of communications, and, more particularly, to the field of communications cables and associated methods.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and a dielectric separating the inner and outer conductors. For example, the dielectric may be a plastic foam material. An outer insulating jacket may also be applied to surround the outer conductor.

Coaxial cables may advantageously be used to connect to a tap at a ground pedestal or at an overhead line to carry signals from the tap to the customer. The tap is, in turn, connected to a trunk cable that typically serves a number of customers. Fiber optic, and electrical multi-conductor cables may alternately or additionally be so configured for such a customer drop application.

Typically an installer carries one or more relatively large reels of drop cable to an installation site to connect the customer to the trunk cable. The approximate length of cable, and some slack, that is needed for the particular drop installation, is manually pulled and then cut from the larger supply on the reel. Both ends of the cable are prepared by installing respective connectors onto ends of the cable. The connectors at the ends of the cable are then respectively coupled to mating connectors at the tap and also at the customer's interface. Unfortunately, this installation procedure is relatively time consuming and uses field-installed connectors that may not be as good and/or reliable as factory-installed connectors. Sometimes one or more of the connectors may not be installed properly. In addition, a considerable and uncontrolled amount of waste cable may be produced by this conventional installation approach.

Relatively long lengths of cable, such as for trunk applications, are typically designed in advance. Accordingly, a pre-connectorized cable can be made at the manufacturing facility with its attendant advantages. For example, U.S. Pat. No. 4,451,013 to Bedrosian discloses a reel for a pre-connectorized telephone cable.

Unfortunately, for drop cable applications, the labor intensive manual approach is typically used. Pre-connectorized cables are not typically available. In addition, there may be no convenient manner to store slack at the drop installation even if a pre-connectorized cable were used.

SUMMARY OF THE INVENTION

In view of the foregoing background, it is therefore an object of the present invention to provide a cable deployment and storage system to enhance the efficiency of installation.

This and other objects, features and advantages of the present invention are provided by a cable deployment and storage system comprising a cable reel mounting device, and a cable reel for carrying a length of cable. The cable reel may include a hub to be rotatably mounted on the cable reel mounting device during deployment of the length of cable. A pair of inner end flanges may be carried by respective opposing ends of the hub, and a pair of removable outer end flanges may be carried by respective inner end flanges. The outer end flanges may extend radially outwardly from the inner end flanges to contain the length of cable therebetween during deployment, and may thereafter be removed to reduce a size of the cable reel. Reducing the size of the cable reel advantageously decreases the amount of storage space necessary to store the reel and any cable slack after installation is completed.

In some embodiments, the cable reel mounting device may comprise a wall mounting device to rotatably mount the cable reel to a wall. The wall mounting device may comprise a lock for selectively locking the cable reel against rotation. The wall mounting device may also include a base to be connected to the wall, and a support arm for rotatably mounting the cable reel. The support arm may be pivotally connected to the base and movable between deployment and storage positions. The wall mounting device may further include a cover for the cable reel.

In other embodiments, the cable reel mounting device may comprise a pair of leg assemblies and a shaft extending therebetween. This device may be readily used for temporarily supporting the cable reel during deployment.

Respective connectors may be on opposing ends of the length of cable. In other words, the cable reel may carry a pre-connectorized cable. The cable may comprise a coaxial cable, a fiber optic cable, or a multi-conductor cable. Color coding indicia may be included on the cable reel to indicate the length of cable from among a plurality of different possible lengths. This advantageously increases installation efficiency by allowing an installer to readily transport a plurality of different lengths of cable, and readily identify a desired length of cable from among the plurality of different lengths of cable. Customer indicia may be included on the removable outer end flanges to be left with a customer.

The removable outer end flanges may have a different shape than the inner end flanges. In some embodiments, the removable outer end flanges may have a square outer peripheral shape, for example.

A method aspect of the present invention is for deploying and storing a length of cable on a cable reel. The method may comprise rotatably mounting the cable reel to a cable reel mounting device, deploying the length of cable from the cable reel, and removing the outer end flanges from the cable reel after deploying the length of cable to reduce a size of the cable reel. The pair of inner end flanges may be used to store any remaining length of cable therebetween after deployment. In other embodiments, the cable may be manually deployed from the reel as the installer carries the reel from the tap to the customer location.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

Figure 2:
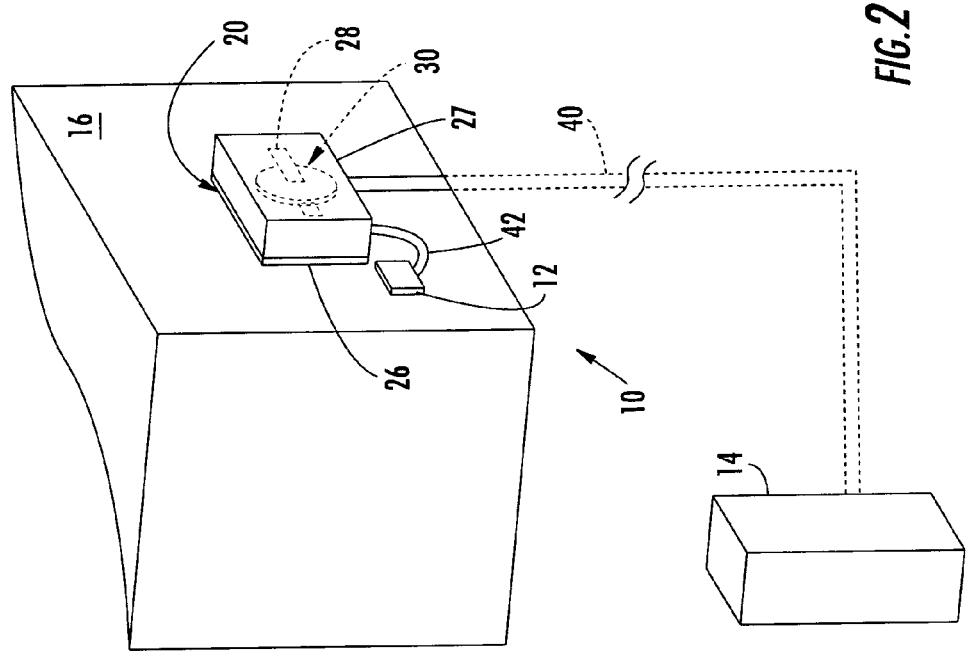
FIG. 2 is a schematic perspective view of the cable deployment and storage system shown in FIG. 1 after deployment.
Figure 1:
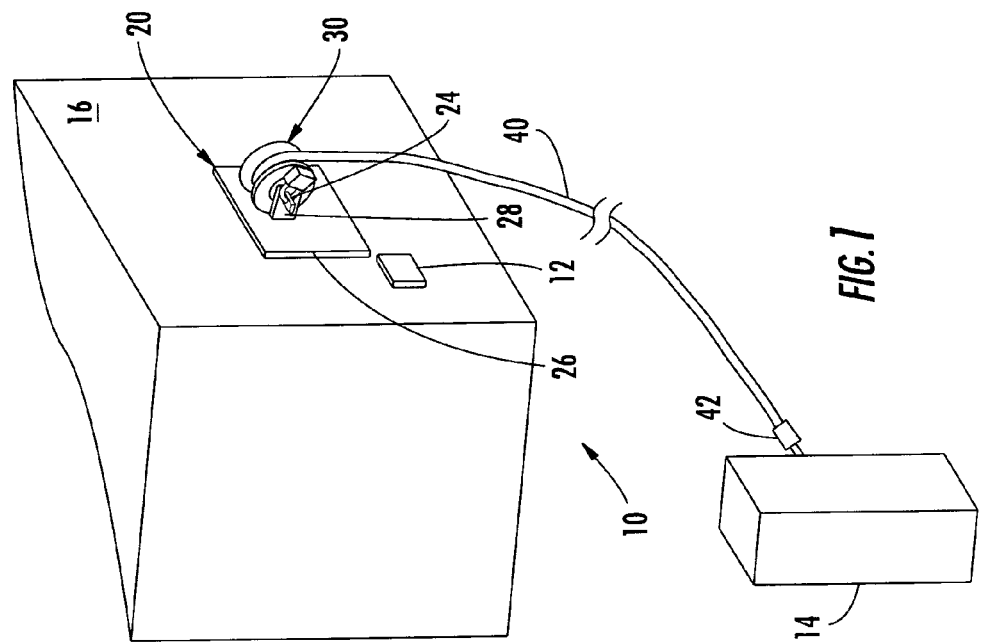
FIG. 1 is a schematic perspective view of a first embodiment of a cable deployment and storage system according to the present invention.
Figure 3:
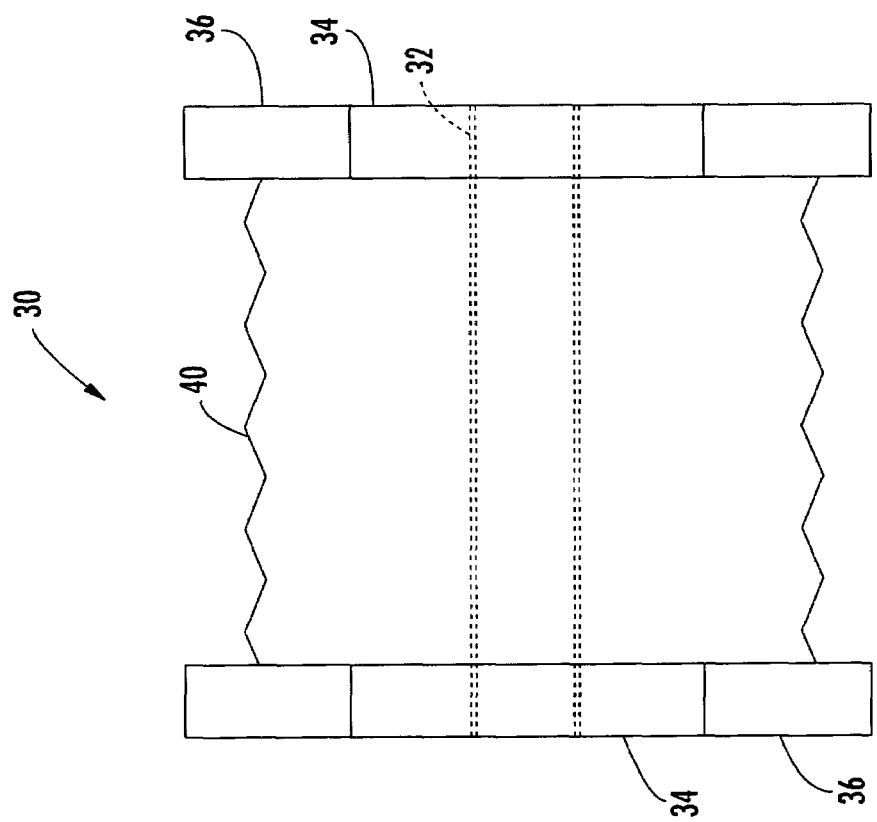
FIG. 3 is a schematic side view of a cable reel as shown in FIG. 1 and prior to cable deployment.

Referring initially to FIGS. 1-4, the cable deployment and storage system 10 of the present invention is now first described. The cable deployment and storage system 10 illustratively comprises a cable reel mounting device 20, and a cable reel 30 for carrying a length of cable 40. In FIG. 1, the length of cable 40 is illustratively extended from the cable reel 30 between an interface 12 at a customer location, and a tap at a pedestal 14 spaced from the customer location. In FIG. 2, the length of cable 40 is shown installed between the tap and the interface 12. More specifically, the length of cable 40 may be buried underground between the customer location and the pedestal 14. Of course, the length of cable 40 may also be installed above ground, as will be appreciated by those skilled in the art.

In the illustrated embodiment, the cable reel mounting device 20 is a wall mounting device to rotatably mount the cable reel 30 to a wall 16. The wall mounting device 20 illustratively includes a lock 24 for selectively locking the cable reel 30 against rotation. More specifically, the lock 24 may engage a portion of the cable reel 30 to lock the cable reel from rotation.

The mounting device 20 illustratively includes a base 26 connected to the wall 16, and a support arm 28 rotatably mounting the cable reel 30. The support arm 28 is moveable between a deployment position (FIG. 1) extending outwardly from the base 26, and a storage position (FIG. 2) with the arm pivoted inward against the base. The mounting device 20 also illustratively includes a cover 27 (FIG. 2) for the cable reel 30. The mounting device 20 may further include a support arm lock (not shown) to lock the support arm 28 from movement between the storage position and the deployment position.

The cable reel 30 illustratively includes a hub 32 to be rotatably mounted on the cable reel mounting device 20 during deployment of the length of cable 40. The hub 32 may be tubular, for example, to advantageously decrease the weight of the cable reel 30 and facilitate mounting for rotation during deployment.

Figure 4:
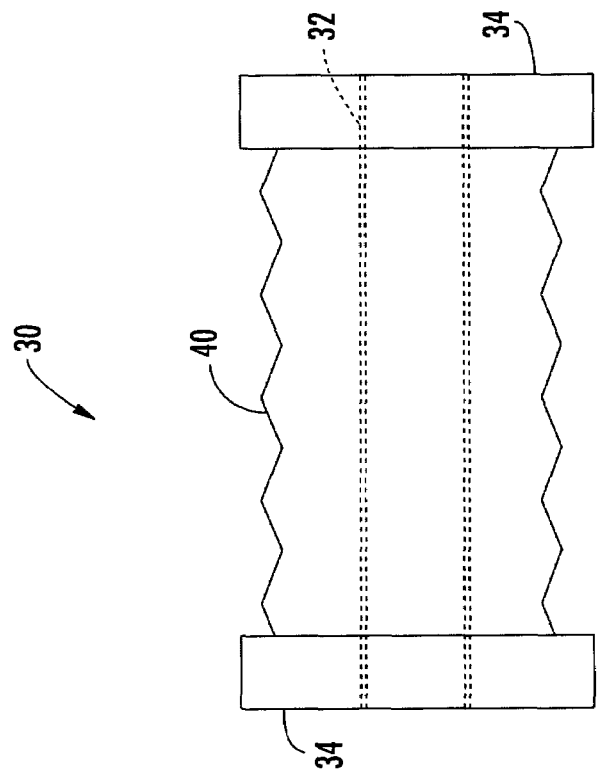
FIG. 4 is a schematic side view of the cable as shown in FIG. 2 and after deployment and removal of the pair of outer end flanges.
Figure 5:
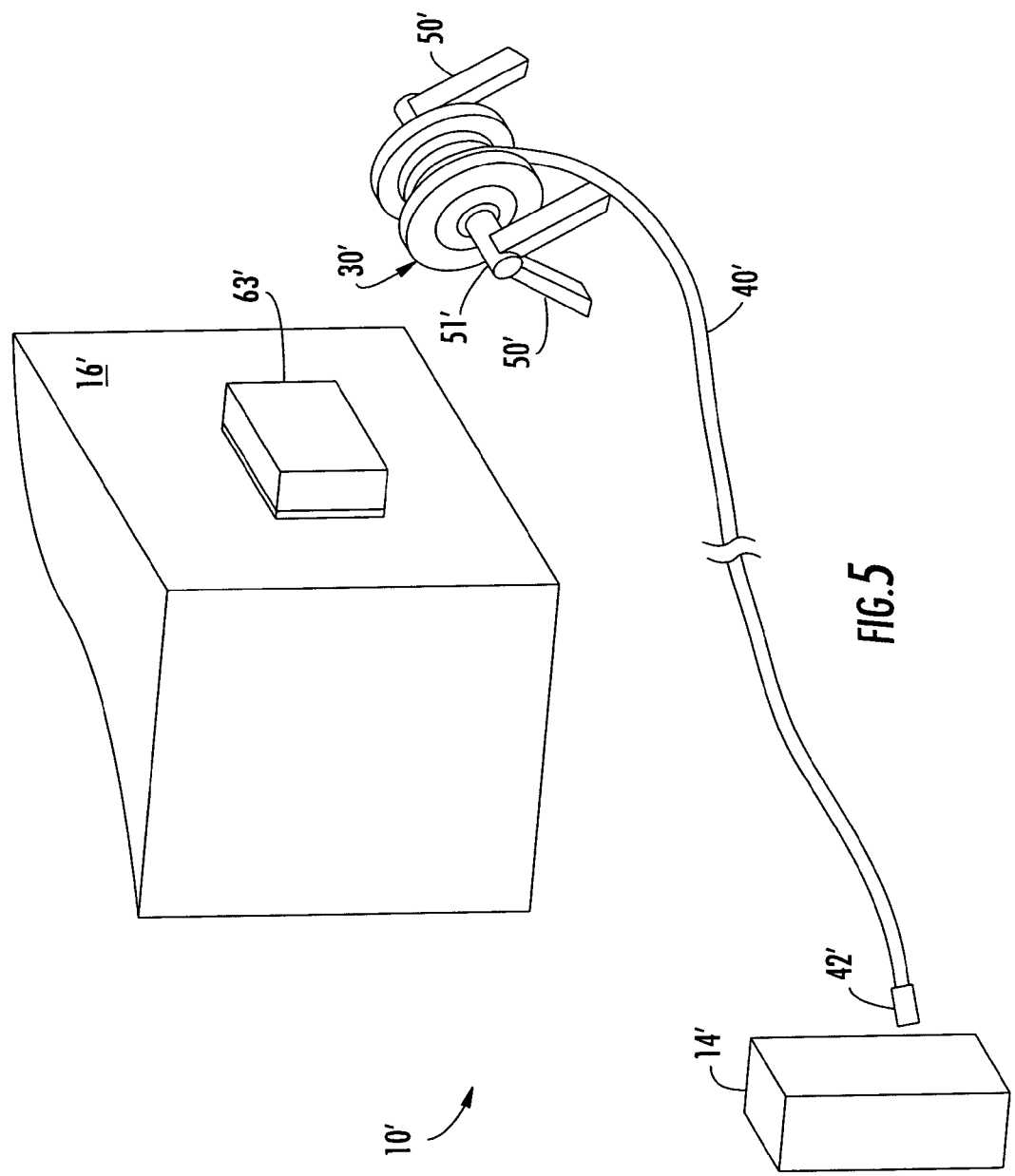
FIG. 5 is a schematic perspective view of a second embodiment of a cable deployment and storage system according to the present invention.
Figure 6:
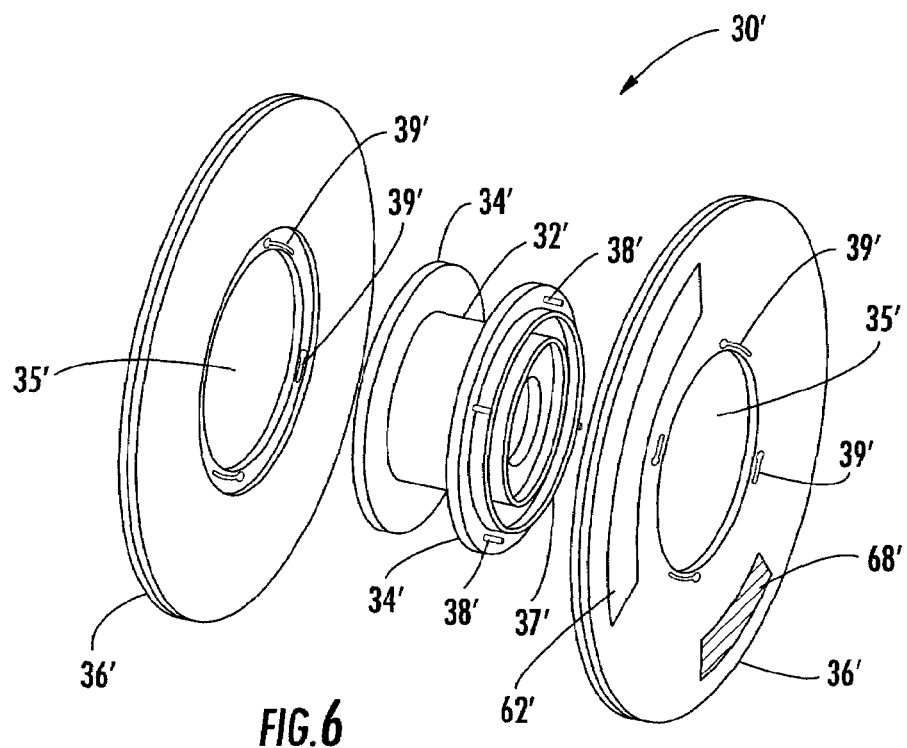
FIG. 6 is an exploded perspective view of the cable reel as shown in FIG. 5.

The cable reel 30 also illustratively includes a pair of inner end flanges 34 carried by respective opposing ends of the hub 32. A pair of removable outer end flanges 36 (FIG. 3) is carried by respective inner end flanges 34 and extend radially outwardly therefrom to contain the length of cable 40 therebetween during deployment. The outer end flanges 36 may thereafter be removed to reduce a size of the cable reel 30. The pair of inner end flanges 34 may store any remaining length of cable therebetween after deployment (FIG. 4). As will be appreciated by those skilled in the art, the removable connection of the outer end flanges 36 to the inner end flanges 34 may be provided by a breakaway material, adhesive, or fasteners, for example. More than two pairs of radially arranged end flanges 34, 36 may be used in other embodiments as is contemplated by the present invention.

It will be understood by those skilled in the art that a plurality of lengths of cable 40 may be carried by the cable reel 30. For example, the lengths of cable may be 25-foot lengths, 35-foot lengths, 50-foot lengths, or any other length of cable as understood by those skilled in the art. These lengths of cable 40 may also be pre-connectorized, that is, a respective connector 42 (FIGS. 1 and 2) may be installed on each opposing end of the length of cable 40. The connector 42 may be installed on the length of cable 40 in a manufacturing facility, for example, which may advantageously enhance the level of craftsmanship. The length of cable 40 may, for example, be a coaxial cable, a fiber optic cable, a multi-conductor cable, or any other type of cable as understood by those skilled in the art.

Referring now additionally to FIGS. 5-8, another embodiment of the cable deployment and storage system 10' is now described. The cable reel mounting device 20' of this embodiment illustratively includes a pair of leg assemblies 50' and a shaft 51' extending therebetween for temporarily supporting the cable reel 30' on a substantially horizontal surface during deployment. For example, the cable reel mounting device 20' may be set up adjacent the interface 12' at the customer location, and the length of cable 40' payed off to the pedestal 14' during deployment.

The cable reel 30' also includes a pair of inner end flanges 34' connected to the hub 32'. The inner end flanges 34' illustratively carry a plurality of fastening members in the form of enlarged head pins 38' positioned in spaced apart relation adjacent the periphery. Further, the inner end flanges 34' have a substantially circular outer peripheral shape, and a lip 37' extending coaxially outwardly from the inner end flanges.

The outer end flanges 36' illustratively have a substantially circular outer peripheral shape, and an inner circular opening 35' therein to receive the lip 37' on the inner end flanges 34'. A plurality of fastening member receiving slots 39' are formed in the outer end flanges 36' for receiving the respective plurality of fastening pins 38'. Each slot 34' has an enlarged end to receive the enlarged head of the pin 38'. Upon relative rotation, the enlarged head of the pin 38' is secured in the smaller width portion of the slot 39'. Of course, other configurations of fasteners are also contemplated by the present invention as will be appreciated by those skilled in the art. In addition, removing the outer end flanges 36' after deployment of the length of cable 40' may be achieved by reversing the rotation as will also be appreciated by those skilled in the art.

The cable reel 30' also includes customer indicia 62' on at least one of the outer end flanges 36' to be left with the customer. The customer indicia 62' may, for example, advantageously be advertising information, service contact indicia, or any other type of indicia, as understood by those skilled in the art. The cable reel also illustratively includes a color-coded patch 68' that may indicate the length or type of cable 40' contained on the reel, for example. The color-coding may take many different forms, such as a band, stripe, or the entire outer flange 36' may have the color coding thereon. This advantageously allows an installer to transport and later select a desired reel 30' from among different reels with different lengths of cable 40'. The color coding may alternately or additionally be provided on the core 32' and/or the inner end flanges 34' so that a technician later viewing the reel would know the length of a replacement cable, for example.

Figure 7:
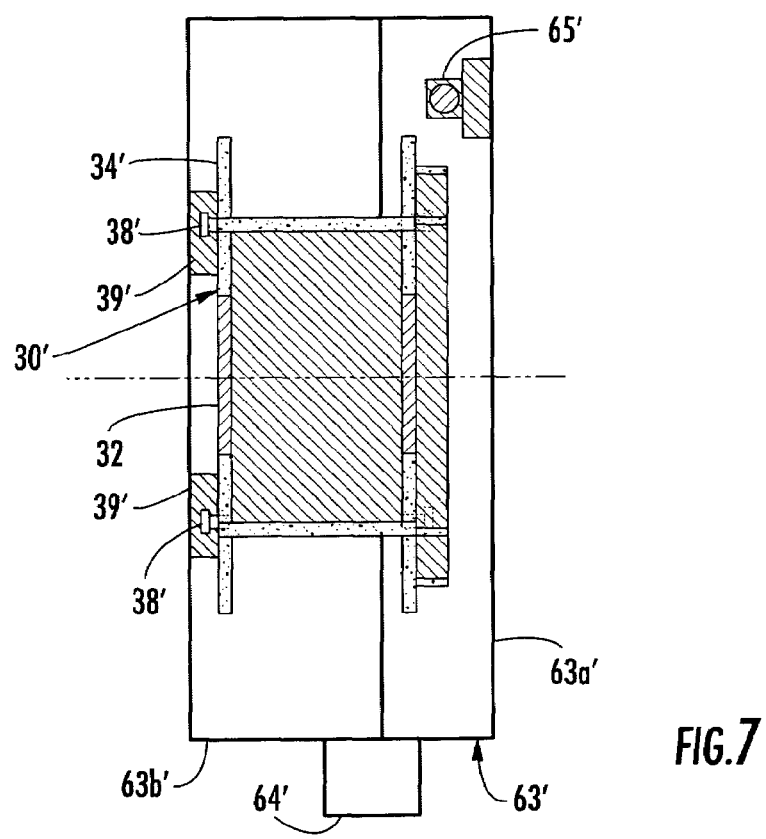
FIG. 7 is a schematic side view of the cable reel as shown in FIG. 6 after installation in its housing.

The cable deployment and storage system 10' illustratively includes a cable reel housing 63' mounted on the wall 16'. The cable reel housing 63' may be the housing of a network interface device (NID) that also comprises an interface to the customer as will be appreciated by those skilled in the art. A series of brackets 39' are provided inside a lid 63b' that is hinged to a base or wall portion 63a' of the housing 63' as shown in FIG. 7. The brackets 39' have corresponding slots along the lines as described above for the outer end flanges 36' to receive the pins 38' on the inner end flanges 34' of the cable reel 30'. Accordingly, the cable reel 30' may be readily stored within the housing 63' after deployment of the cable 40', and removal of the outer end flanges 36'. A cable entrance port 64' is also provided at the bottom of the housing 63', and a grounding connector 65' is also illustratively provided within the housing 63'.

Figure 8:
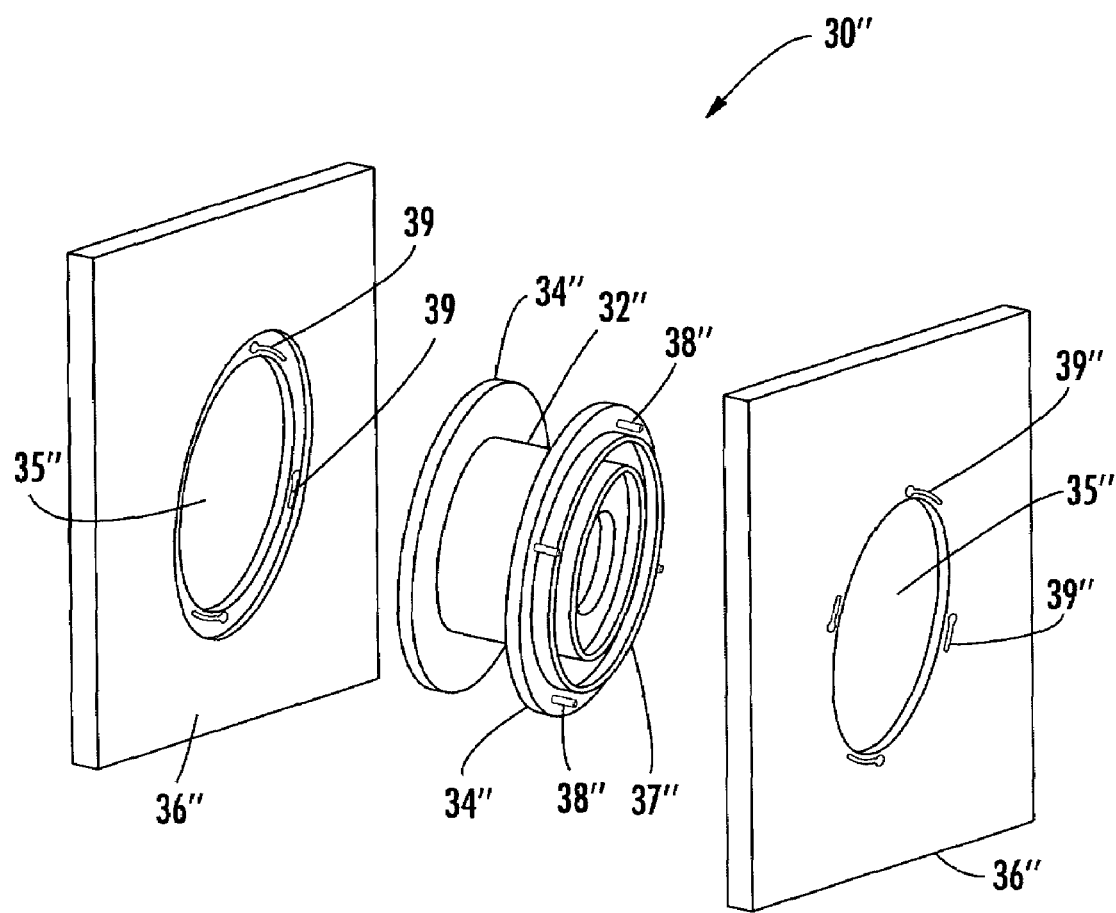
FIG. 8 is an exploded perspective view of a variation of the cable reel as shown in FIG. 6.

Turning now additionally to FIG. 8, yet another embodiment of the cable reel 30" is now described. In this embodiment, the end flanges 36" have a square outer periphery. This may be desirable to prevent unintended rolling, for example. Other configurations of outer end flanges 36" are also contemplated by the present invention as will be appreciated by those skilled in the art. In addition, the outer end flanges 36" may also be made in sections rather than in a single piece as shown in the illustrated embodiment. Of course, the inner end flanges 34" could also be provided in different shapes corresponding to or different from the outer end flanges 36". Those other features of the cable reel 30" not specifically described, are marked with double prime notation and are similar to corresponding elements described above.

Figure 9:
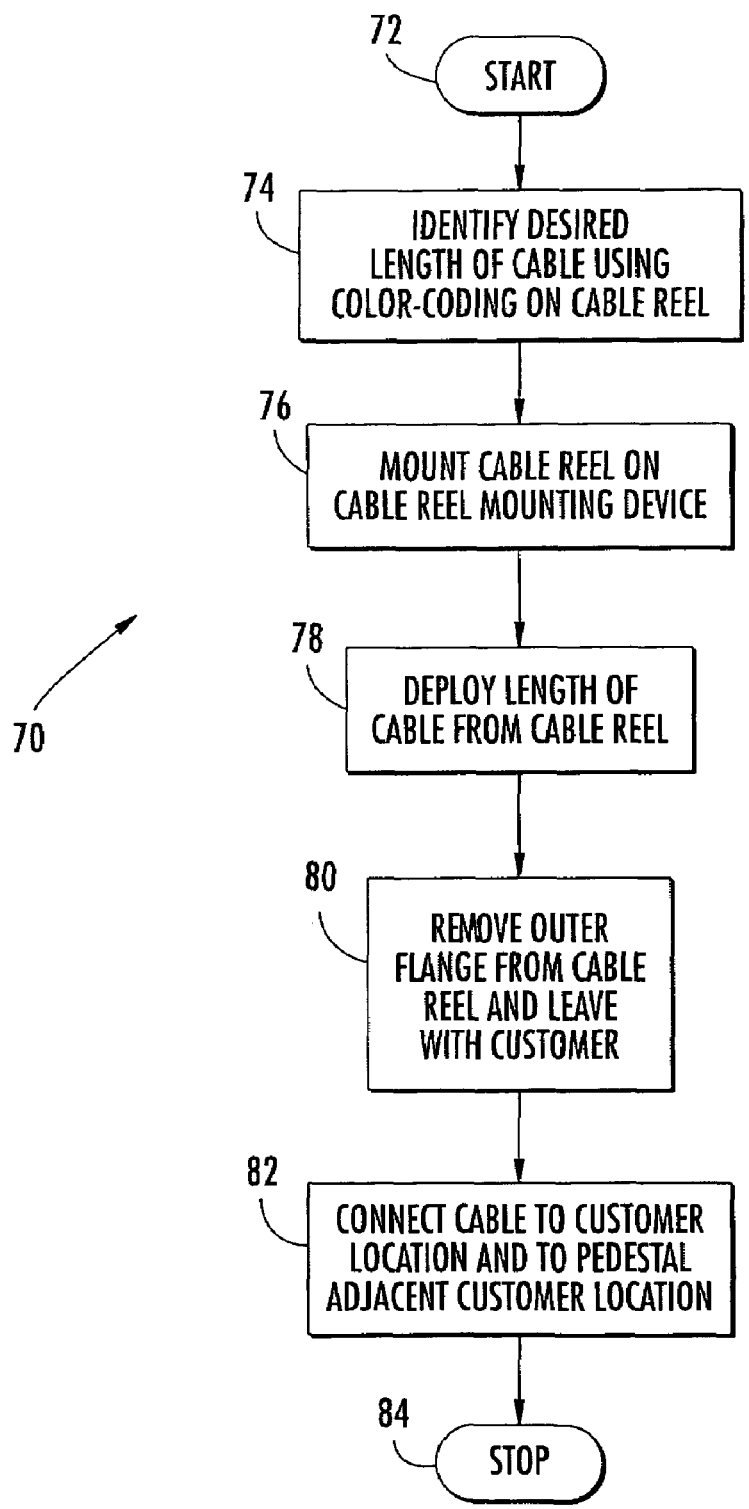
FIG. 9 is a flow chart illustrating a method of deploying and storing a length of cable according to the present invention.

Referring now additionally to the flow chart 70 of FIG. 9, a method of deploying and storing a length of cable 40 on a cable reel 30 is now described. From the start (Block 72), a desired length of cable 40 is identified, such as by using color coding indicia on a cable reel 30 at Block 74. At Block 76, the cable reel 30 is rotatably mounted on the cable real mounting device 20. Alternately, the cable reel 30 could be rotatably mounted on a screw driver, for example, and walked along the route by an installer.

At Block 78, the length of cable 40 is deployed from the cable reel 40. The pair of outer flanges 36 are removed from the cable reel 30 and left with the customer at Block 80. At Block 82, the length of cable is connected to the interface 12 at the customer location and to the pedestal 14 adjacent the customer location, and the method is completed at Block 84.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

The invention claimed is:

1. A cable deployment and storage system comprising:
a cable reel mounting device; and
a cable reel for carrying a length of cable and comprising
a hub to be rotatably mounted on said cable reel mounting device during deployment and having an outer surface for receiving the length of cable thereon,
a pair of inner end flanges carried by respective opposing ends of said hub and extending radially outwardly from the outer surface of said hub, and
a pair of removable outer end flanges carried by respective inner end flanges and extending radially outwardly therefrom to contain said length of cable therebetween during deployment and thereafter being removable to reduce a size of said cable reel, each removable outer end flange having an inner circumferential edge spaced radially outwardly from the outer surface of said hub by a respective one of said inner end flanges,
said pair of inner end flanges for storing any remaining length of cable therebetween after deployment,
said cable reel mounting device comprising a wall mounting device to rotatably mount said cable reel to a wall.

2. A cable deployment and storage system according to claim 1 wherein said wall mounting device further comprises a lock for selectively locking said cable reel against rotation.

3. A cable deployment and storage system according to claim 1 wherein said wall mounting device comprises:
a base to be connected to the wall; and
a support arm for rotatably mounting said cable reel and being pivotally connected to said base and movable between deployment and storage positions.

4. A cable deployment and storage system according to claim 1 wherein said wall mounting device further comprises a cover for said cable reel.

5. A cable deployment and storage system according to claim 1 wherein said cable reel mounting device comprises a pair of leg assemblies and a shaft extending therebetween for temporarily supporting said cable reel during deployment.

6. A cable deployment and storage system according to claim 1 further comprising respective connectors installed on opposing ends of said length of cable.

7. A cable deployment and storage system according to claim 1 wherein said length of cable comprises at least one of a coaxial cable, a fiber optic cable, and a multi-conductor cable.

8. A cable deployment and storage system according to claim 1 further comprising color coding indicia on said cable reel to indicate said length of cable from among a plurality of different possible lengths.

9. A cable deployment and storage system according to claim 1 further comprising customer indicia on at least one of said removable outer end flanges to be left with a customer.

10. A cable deployment and storage system according to claim 1 wherein said removable outer end flanges have a different shape than said inner end flanges.

11. A cable deployment and storage system according to claim 1 wherein said removable outer end flanges have a square outer peripheral shape.

12. A method for deploying and storing a length of cable on a cable reel comprising a hub having an outer surface for receiving the length of cable thereon, a pair of inner end flanges carried by respective opposing ends of the hub and extending radially outwardly from the outer surface of the hub, and a pair of removable outer end flanges carried by respective inner end flanges, each removable outer end flange having an inner circumferential edge spaced radially outwardly from the outer surface of the hub by a respective one of the inner end flanges, the method comprising:
rotatably mounting the cable reel on a wall mounting device;
deploying the length of cable from the cable reel; and
removing the outer end flanges after deploying so that the inner end flanges remain extending radially outwardly from the outer surface of the hub to store any remaining length of cable therebetween and to reduce a radial size of the cable reel.

13. A method according to claim 12 further comprising selectively locking the cable reel against rotation on the wall mounting device.

14. A method according to claim 12 wherein the wall mounting device comprises a base and a support arm pivotally connected to the base; and further comprising mounting the base to a wall, and moving the support arm between deployment and storage positions.

15. A method according to claim 12 wherein rotatably mounting comprises rotatably mounting the cable reel the wall mounting device comprising a pair of leg assemblies and a shaft extending therebetween.

16. A method according to claim 12 further comprising respective connectors on opposing ends of the length of cable.

17. A method according to claim 12 wherein the length of cable comprises at least one of a coaxial cable, a fiber optic cable, and a multi-conductor cable.

18. A method according to claim 12 further comprising providing color coding indicia on the cable reel to indicate the length of cable from among a plurality of different possible lengths.

19. A method according to claim 12 further comprising providing customer indicia on the removable outer end flanges.

* * * * *